Dec. 4, 1923.                                                           1,476,347
                              T. J. MARTIN
                      STEERING WHEEL FOR AUTOMOBILES
                           Filed May 1, 1923
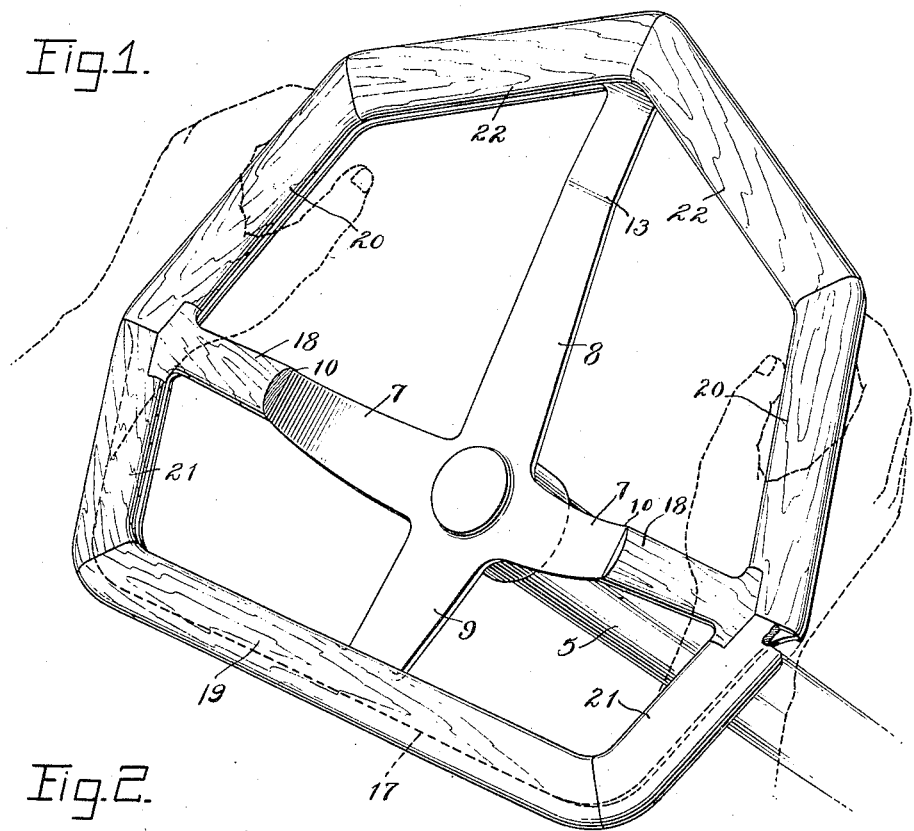
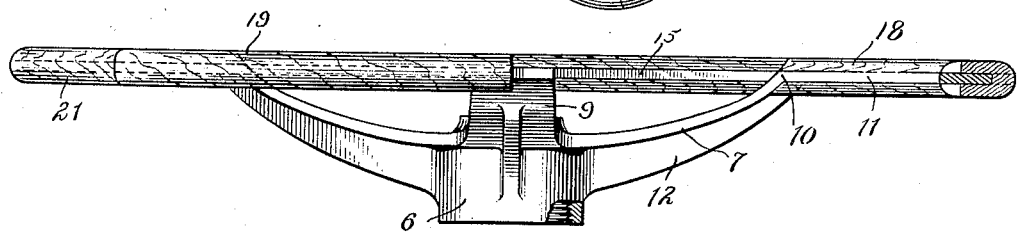
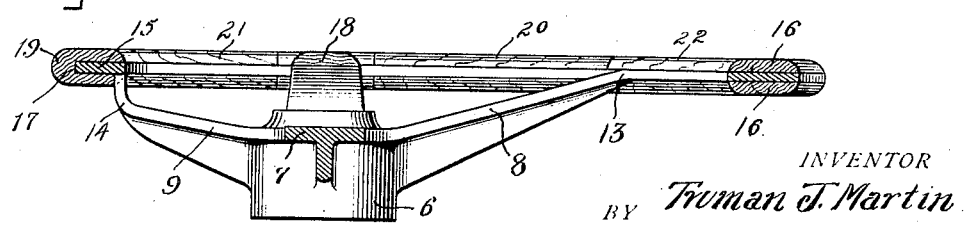
INVENTOR
BY *Truman J. Martin*
*Honay H Cole* ATTORNEY Patented Dec. 4, 1923.

1,476,347

UNITED STATES PATENT OFFICE.

TRUMAN J. MARTIN, OF BETHLEHEM, PENNSYLVANIA.

STEERING WHEEL FOR AUTOMOBILES.

Application filed May 1, 1923. Serial No. 635,892.

*To all whom it may concern:*

Be it known that I, TRUMAN J. MARTIN, a citizen of the United States of America, and a resident of Bethlehem, Pennsylvania, have invented certain new and useful Improvements in Steering Wheels for Automobiles, of which the following is a specification.

This invention is an improvement in steering wheels for motor vehicles.

It has been found by physicians and others who have made a study of the subject, that the circular steering wheel commonly in use, is one of the chief factors in producing fatigue in driving motor cars. This is because the curvature of the wheel does not provide a natural grip for the hand or hands of the driver, but on the other hand requires an undue and practically continuous exertion on the part of the muscles controlling the hand, in retaining a grip on the circular wheel. This muscular action, after the driver has become experienced, becomes more or less unconscious. Nevertheless, the work done by the muscles, conscious or unconscious, after a continuous period of driving, (the length of time depending upon the resistance of the driver) manifests itself in the form of fatigue.

With the circular type of wheel, a comparatively constant grip must be maintained on it, in order to afford a hold for the hand, and to prevent the wheel being thrown to one side or the other by deflection of the front wheels of the vehicle, particularly where irreversible steering gearing is not utilized in the steering assembly.

The main object of my invention is to provide a steering wheel which, from its construction, will afford a natural grip for the hands, so that constant muscular effort will not be required to retain a controllable grip on the wheel.

This I accomplish by making the sections of the rim of the wheel usually utilized in steering, straight, and at such inclinations as to allow the hands of the driver to engage the sections of the wheel with the least effort and without requiring a bending or twisting of the wrist, or displacement of the hands from a normal position relatively to the wrists and arms.

I further provide the portion of the wheel to the rear of the steering post, with a substantially straight bar, which is set relatively close to the post, and which affords a rest for the wrists of the driver. Furthermore, by having this portion of the wheel straight and set close to the post, more room between the driver's seat and the wheel is provided than is usually the case with the ordinary circular wheel.

With the foregoing and other objects in view, which will become apparent as the description proceeds, the invention resides in the construction, combination and arrangement of parts hereinafter more fully described and claimed, and illustrated in the accompanying drawing, in which like characters of reference indicate like parts throughout the several figures of which,—

Figure 1 represents a view in perspective of a steering wheel constructed in accordance with my invention.

Figure 2 represents a rear elevational view thereof, particularly in section, and Figure 3 represents an elevational view, partially broken away, looking at the wheel from the right hand side thereof.

Referring more particularly to the drawing, the steering post is indicated at 5, the hub of the steering wheel at 6, the transverse arms of the spider of the wheel at 7, the forward arm of the spider at 8, and the rear arm of the spider at 9. The transverse arms 7 are of equal length, and as shown, may be curved upwardly from the hub 6 to selected points such as 10, within the rim of the wheel, from which points they may extend straight out to the rim, as at 11. The curved portions of the arms may be reinforced by a web 12, as shown. The forward arm 8 of the spider is of greater length than the rear arm 9 thereof, and extends forwardly and upwardly to a point 13, from which point it extends straight to the wheel rim. The rear arm 9 extends outwardly and upwardly at an angle to a point 14 from which point it may extend straight up, parallel with the axis of the hub, and join the rim.

The rim is preferably made of a flat metallic core 15, to which the arms of the spider connect, such core being covered on its upper and lower surfaces with relatively thin wooden facings 16. The straight outer end portions of the arms 7 may likewise be covered with wooden facings 18. That portion of the core which lies within the wheel rim to the rear of the steering post, may have its outer edge disposed within the periphery of the wooden facings, as indicated at 17, so that the rear surfaces of the portion of the rim toward the driver's seat will be of wood, and thereby prevent any metal coming in contact with the clothing of the driver, while the portion of the core occupying the remainder of the wheel rim may extend through from the periphery to the inner edge thereof.

The portion or bar 19 of the wheel rim at the rear, i. e., nearest the driver, is substantially straight and is relatively long, and as will be observed, is disposed relatively close to the hub of the wheel. This bar may serve as a rest for the portions of the arms near the wrists, in addition to being capable of being grasped when desired, for steering purposes. By placing this bar near the hub of the wheel, not only may it afford a rest for the portions of the arms near the wrists, but it also increases the distance between the driver's seat and the wheel. This is of importance, since it may allow easier ingress and egress from the driver's seat, and it also allows of a wheel of greater diameter being used without encroaching upon the space which should be left between the driver's seat and the wheel. The present day practice is to use eighteen inch circular steering wheels. If a larger diameter of wheel is used, the rear portion of the wheel projects further toward the driver, and so cramps the space that it is difficult for a driver to get in and out of his seat behind the wheel. However, by constructing the wheel according to my invention, its diameter may be increased from fifteen to twenty-one inches, and the bar 19 will be no nearer the driver's seat than the rear portions of the round eighteen inch wheels now commonly in use. The advantage of the larger diameter wheel, of course, is that it allows a greater leverage, and tends to easier control of the front wheels, particularly in the case of heavy trucks.

The covered portions of the lateral arms 7 of the wheel web lie in parallel relation with the bar 19, and may, if desired, be grasped in steering, or, when hand grips 20 of the wheel are grasped, as indicated by the dotted line positions of the hands in the drawing, these covered portions of the diametric arm afforded by the arms 17 serve as rests for the base of the hands of the driver.

The hand grips 20 are inclined toward the front of the wheel at such angles as to allow the hands to grip them naturally and with the least effort, and without displacement of the hands from their normal position relatively to the wrists or arms. The angles formed between the hand grips 20 and the diametric arm serve as stops for the bases of the thumbs when one or the other of the hands is pulled toward the driver in turning to the right or left.

The portions 21 of the wheel rim, at the ends of the bar 19, are also straight and are arranged at such angles to the bar as to form stops for the hands when either the bar 19, or the portions 21 are grasped in turning the wheel. Similarly, the portions 22 of the wheel rim, at its front, are straight, and are arranged at angles to the hand grips 20, and at an angle to each other.

In use, the hand grips 20 may serve as means for grasping the wheel, or either of the resting arms or bars may serve this purpose, or the hands may be placed in stepped relation on the wheel, as best serves the desire of the driver. In any event, the grips for the hands are straight, and are so placed as to allow of a natural resting of the hands on the wheel, and a turning and control of the wheel without a tight or unduly strong grasp. This natural and easy control of the wheel by means of the straight gripping portions of its rim, is augmented by the provision and the disposition of the angle stops which serve as stops or rests for the thumbs and ends of the hands when in position on the wheel.

Practice has demonstrated that with a wheel constructed according to my invention, the objects of the invention are accomplished with an unusual degree of success, so that driving fatigue is relieved to a great extent. The foregoing detailed description is illustrative of the preferred form of my invention, and I do not desire any limitations or deductions to be made therefrom, but the appended claims should be construed as broadly as permissible, in view of the prior art.

Having thus described my invention what I claim as new, and desire to secure by Letters Patent is,—

1. A steering wheel including a rim, a diametric resting arm, and a resting bar in parallel relation with the resting arm, the resting bar forming a part of the wheel rim.

2. A steering wheel including a rim, a diametric resting arm, and a straight resting bar in parallel relation with the resting arm, the resting bar forming a part of the wheel rim, and having its central portion nearer to the wheel hub than the remaining portions of the wheel rim.

3. A steering wheel including a rim composed of straight sections, one of which is longer than the others, the central portion of the longer section being disposed nearer the wheel hub than the remaining portions of the rim.

4. A steering wheel including a rim, a diametric resting arm, a resting bar in parallel relation with the resting arm, and straight portions forming parts of the rim, arranged at the ends of the diametric resting arm and the resting bar, at angles thereto to form stops for the hands of the operator.

5. A steering wheel including a rim having a straight bar portion forming a part of the rim, the portions of the rim at the ends of the bar being straight and arranged at angles to the bar to form stops for the hands of the operator.

6. A steering wheel including a rim composed of straight portions of such size as to accommodate at least one hand of the operator of the wheel, the straight portions of the rim being arranged at such angles to each other as to form stops for the hands of the operator.

In testimony whereof I hereunto affix my signature.

Dr. TRUMAN J. MARTIN.

Witness:
 Minnie H. Becker.